United States Patent
Kolmeder et al.

(10) Patent No.: US 6,180,913 B1
(45) Date of Patent: *Jan. 30, 2001

(54) MULTI-HEAD LASER ENGRAVING MACHINE

(75) Inventors: Christian Kolmeder, Icking; Ralf Turban, Pahl/Fischen, both of (DE)

(73) Assignee: Carl Baasel Lasertechik GmbH, Starnberg (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/916,362

(22) Filed: Aug. 22, 1997

(30) Foreign Application Priority Data

Aug. 23, 1996 (DE) ................ 196 34 190

(51) Int. Cl.⁷ .................................... B23K 26/36
(52) U.S. Cl. ................ 219/121.68; 219/121.77
(58) Field of Search ............... 219/121.68, 121.76, 219/121.77, 1; 359/211, 212, 223, 225, 226; 385/16, 18

(56) References Cited

U.S. PATENT DOCUMENTS

| | | | |
|---|---|---|---|
| 3,803,379 | * 4/1974 | McRay | 219/121.6 |
| 4,533,813 | * 8/1985 | Rayburn et al. | 219/121.68 |
| 4,564,739 | 1/1986 | Mattelin | |
| 4,645,900 | 2/1987 | Heyden | |
| 4,701,591 | * 10/1987 | Masaki et al. | 219/121.77 |
| 4,893,891 | * 1/1990 | Fujita et al. | 385/16 |
| 5,175,780 | * 12/1992 | Sano et al. | 385/18 X |
| 5,436,986 | * 7/1995 | Tsai | 385/16 |

FOREIGN PATENT DOCUMENTS

| | | | |
|---|---|---|---|
| 4213424 | * 10/1992 | (DE) | 219/121.63 |
| 43 22 252 A1 | 7/1993 | (DE) | |
| 60-137590 | * 7/1985 | (JP) | |
| 61-33786 | * 2/1986 | (JP) | |
| 61-206585 | * 9/1986 | (JP) | |
| 3-47685 | * 2/1991 | (JP) | 219/121.75 |
| 0 316 9489 | 7/1991 | (JP) | |
| 8-215875 | * 8/1996 | (JP) | |

* cited by examiner

Primary Examiner—Samuel M. Heinrich
(74) Attorney, Agent, or Firm—Bacon & Thomas, PLLC

(57) ABSTRACT

A multi-head laser engraving machine with two exposure heads (15, 16) contains a beam splitter (3) belonging to the first exposure head (15), and a tilted mirror belonging to the second exposure head (16). Each exposure head (6, 7) has associated therewith a fast optical switch, the switches being drivable independently of each other by a control unit (9). This permits simultaneous and independent inscription of the working areas (F1, F2) associated with the respective exposure heads (15, 16). The fast optical switches have the form of a deflection prism which is swiveled into the focused partial beam in order to interrupt the beam.

9 Claims, 2 Drawing Sheets

MULTI-HEAD LASER ENGRAVING MACHINE

BACKGROUND OF THE INVENTION

1. Field of the Invention

This invention relates to a multi-head laser engraving machine having a laser, at least two exposure heads each with an optical system/deflection unit for directing part of the laser beam energy to a working area of a workpiece surface as an engraving beam, and a control unit.

2. Description of the Related Art

Such multi-head laser engraving machines, which are typically executed as two-head machines, are used for example for efficiently inscribing plastic parts, for example radio panels (Ulrich Over, Ulrich Hartmann, "Laserbeschriftung $\mu$-genau," supplement to Hanser Fachzeitschriften, October 1991, pages LS113, LS114, Carl Hanser Verlag, Munich).

The laser is typically an Nd:YAG laser with a power of 50 to 100 watts. One exposure head is preceded by a beam splitter, the other exposure head by a tilted mirror. A galvanometer deflection unit with a following optical system present in each exposure head moves the beam within the working area on a workpiece surface. By on-off control of the laser beam the workpiece surface is engraved or inscribed in each working area. Since laser inscription is a frequent application for such an apparatus, such an exposure head is also called an inscription head or deflection head.

The deflection units in each exposure head are typically moved in synchronism so that with corresponding control of the laser the same inscription is done in each working area.

As an alternative embodiment, a swiveling mirror or the like can be provided, instead of a beam splitter, for the exposure head directly following the laser so that the total energy of the laser beam is directed by the swiveling mirror via the deflection unit to the first working area, or directed by the tilted mirror and the second exposure head to the working area associated with the latter. In this way one can engrave different patterns with the two exposure heads, but only staggered in time. In the prior art there are thus only the two mutually exclusive possibilities of obtaining the same inscription in the working areas using a beam splitter or obtaining independent inscription using a beam changeover switch, but not both simultaneously.

SUMMARY OF THE INVENTION

The invention is based on the problem of stating a multi-head laser engraving machine of the stated kind which permits simultaneous independent inscription with the individual exposure heads.

This problem is solved in a multi-head laser engraving machine of the stated kind according to the invention in that each exposure head has associated therewith a controlled fast optical switch for either transmitting or blocking the corresponding part of the laser beam energy, and the switches are drivable by the control unit independently of each other.

In a preferred embodiment the inventive laser engraving machine is executed as a double-head machine, i.e. two exposure heads are present whereby half of the laser output is available for inscription in each exposure head. For this purpose the laser is followed directly by a beam splitter which divides the energy in half. A three-head machine would have first and second beam splitters for initially transmitting two thirds of the beam energy, the second beam splitter then dividing the beam energy in half so that one third of the laser energy would be available for each exposure head. Machines with even more laser heads are equipped with beam splitters accordingly in order to obtain a uniform energy distribution over all exposure heads.

There are laser engraving machines which direct the engraving beam across the working area on the workpiece surface by relative motion between exposure head and workpiece surface, laser energy being delivered by the laser at the places to be engraved while no laser energy is delivered at the places not to be engraved. The inventive measure can also be used in such machines, i.e. one can provide a multi-head machine whereby each exposure head has a fast optical switch associated therewith.

However, the invention is preferably used in machines with a deflection unit in the form of galvanometer mirrors for example. In such a machine there is no relative motion between the workpiece surface and the laser optical system during the exposure process, but. rather the working area to be inscribed on the workpiece surface is scanned by the deflection unit.

The fast optical switch provided according to the invention is able either to transmit the partial beam so that it is directed by the deflection unit to the necessary place on the working surface, or to block the beam. This blocking is preferably done with the aid of a deflection prism which is swiveled into the laser beam focused specially for this purpose. This mechanical swiveling process can be switched with a frequency of more than 1000 Hz using a special deflection unit, for example a deflection unit designed in the manner of a galvanometer mirror. Specifically the switch used is a deflection prism which, in the off state of the switch, directs the partial beam having a relatively high energy density to an absorber unit where the energy of the partial beam is dissipated.

In the inventive multi-head laser engraving machine, the laser itself is not driven in accordance with the inscription pattern, but the optical switches are driven such that the desired inscription pattern arises while the laser itself remains continuously turned on.

In a double-head laser engraving machine having an Nd:YAG laser with a power of for example 80 watts, each individual optical switch is under least favorable conditions hit continuously by the full power of the partial beam, i.e. half the laser power (40 watts). It has turned out that a deflection prism can dissipate this energy even in its focused form.

The inventive design of the laser engraving machine of course permits (both) working areas to be machined with identical inscription patterns, like the known machine. In this case the two optical switches are driven with the same control signals. The two switches can also be driven independently, however, so that with a double-head laser engraving machine the two working areas can be given different inscription patterns. The exposure heads are then adjusted such that the two working areas are adjacent to each other.

In another embodiment of the invention the working areas are adjusted such that they at least partly overlap. With such a machine one can inscribe twice as fast in the overlap area as in the other areas. This can be advantageous with some inscription patterns.

BRIEF DESCRIPTION OF THE DRAWINGS

In the following some embodiments of the invention will be explained more closely with reference to the drawing, in which.

DETAILED DESCRIPTION OF THE PREFERRED EMBODIMENTS

Before the inventive multi-head laser engraving machine is explained more closely, the prior art will be briefly discussed with reference to FIGS. 4 to 6.

Nd:YAG multimode laser 101 with schematically indicated electronic control unit 109 delivers laser beam L1 to first exposure module KI. (This module need not necessarily be one structural unit.) In exposure module KI there is a beam splitter or a beam changeover switch which will be explained more closely below. First exposure module KI is followed by second exposure module KII which receives laser beam L1 not at all, completely or as a partial beam (50%).

Each exposure module KI and KII has associated exposure head 115, 116 (see FIGS. 5 and 6) in the form of a galvanometer deflection unit and an optical system so that it directs engraving beam SI, SII to working area FI, FII on the surface of workpiece W. The machining beam scans the working area. By on-off control of laser 101, engraving beam SI, SII is either turned on or turned off so that a corresponding pattern is engraved (inscribed). Separating line T in FIG. 4 indicates that working areas FI and FII need not be on one and the same workpiece W but can be on two individual workpieces.

Figure 4:
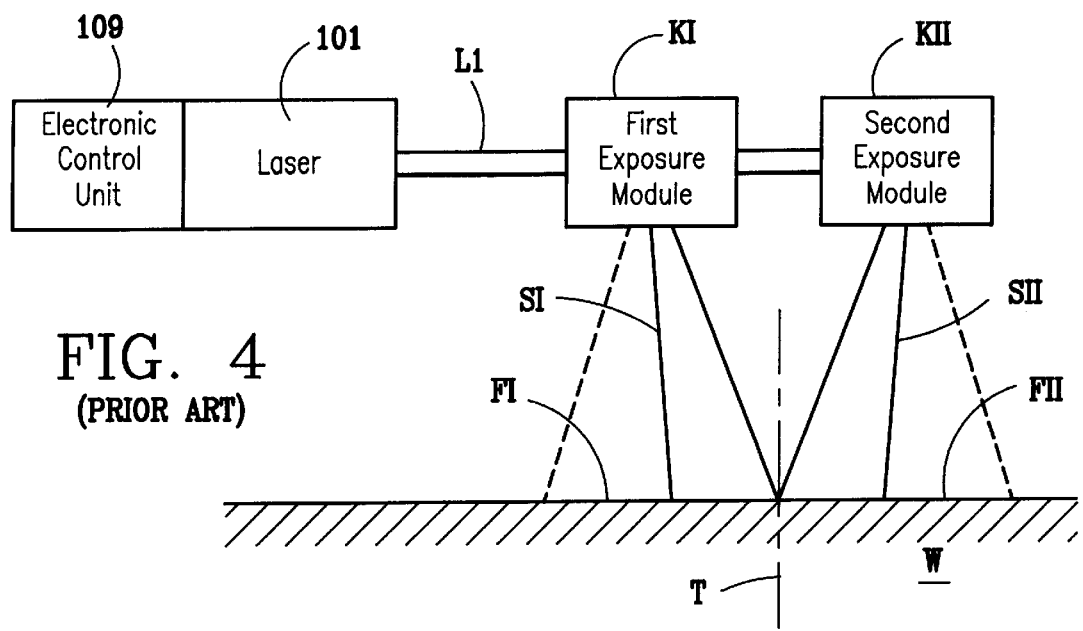
FIG. 4 shows a double-head laser engraving machine according to the prior art.
Figure 5:
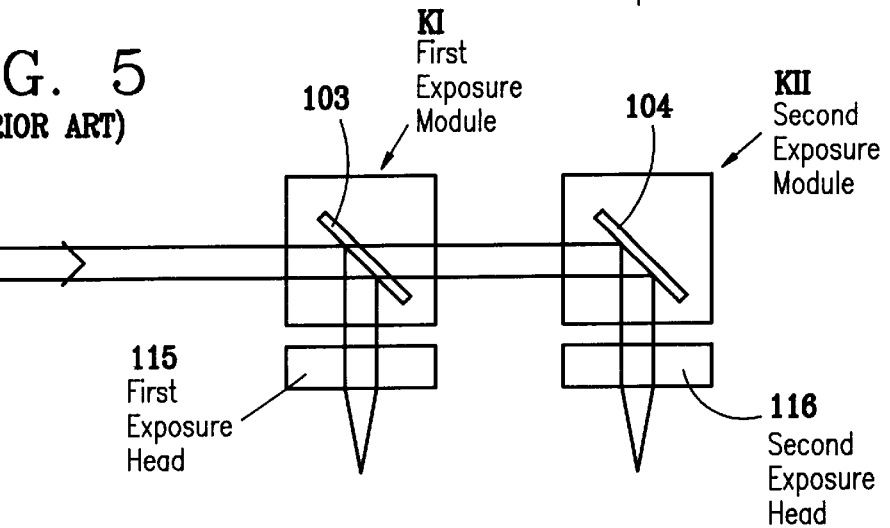
FIG. 5 shows a schematic representation of a double-head laser engraving machine for simultaneous and identical inscription.

FIG. 5 shows one embodiment of the laser engraving machine of FIG. 4, an embodiment for simultaneous and identical inscription. Beam splitter 103 is located in first exposure module KI to transmit about 50% of the laser beam energy and deflect 50%. In exposure module KII there is tilted mirror 104. For each exposure module a galvanometer deflection unit in conjunction with an objective is indicated schematically as an exposure head at 115, 116. Parts KI and KII designed here as structurally integrated modules can also be separated spatially, e.g. an optical fiber can be disposed between the beam splitter or tilted mirror and the following exposure head. Through control of the laser beam, an equal quantity of laser beam energy reaches the working area of each exposure head so that simultaneous inscription with identical information (identical pattern) takes place.

Figure 6:
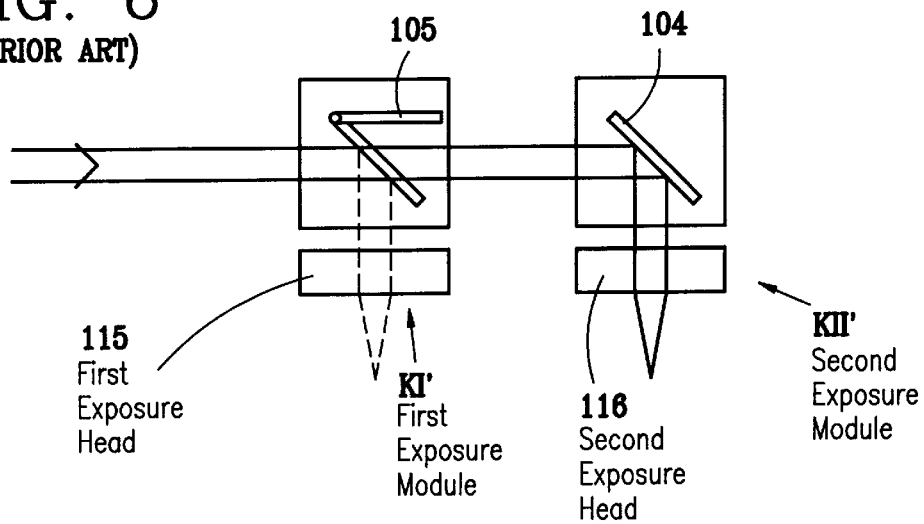
FIG. 6 shows a schematic representation of a double-head laser engraving machine for independent but non-simultaneous inscription according to the prior art.

FIG. 6 shows an embodiment wherein first exposure module KI' contains a beam changeover switch in the form of swiveling mirror 105. Exposure module KII' is formed just like exposure head KII in FIG. 5, i.e. it contains tilted mirror 104.

Depending on whether swiveling mirror 105 in FIG. 6 is swiveled up or swiveled into its deflection position shown by dashed lines, the laser beam either passes fully into exposure module KII' or is deflected completely to reach the working area belonging to exposure module KI'.

Comparison of FIGS. 5 and 6 thus shows that either only simultaneous inscription with the same inscription pattern, or independent but non-simultaneous inscription, is possible.

Figure 1:
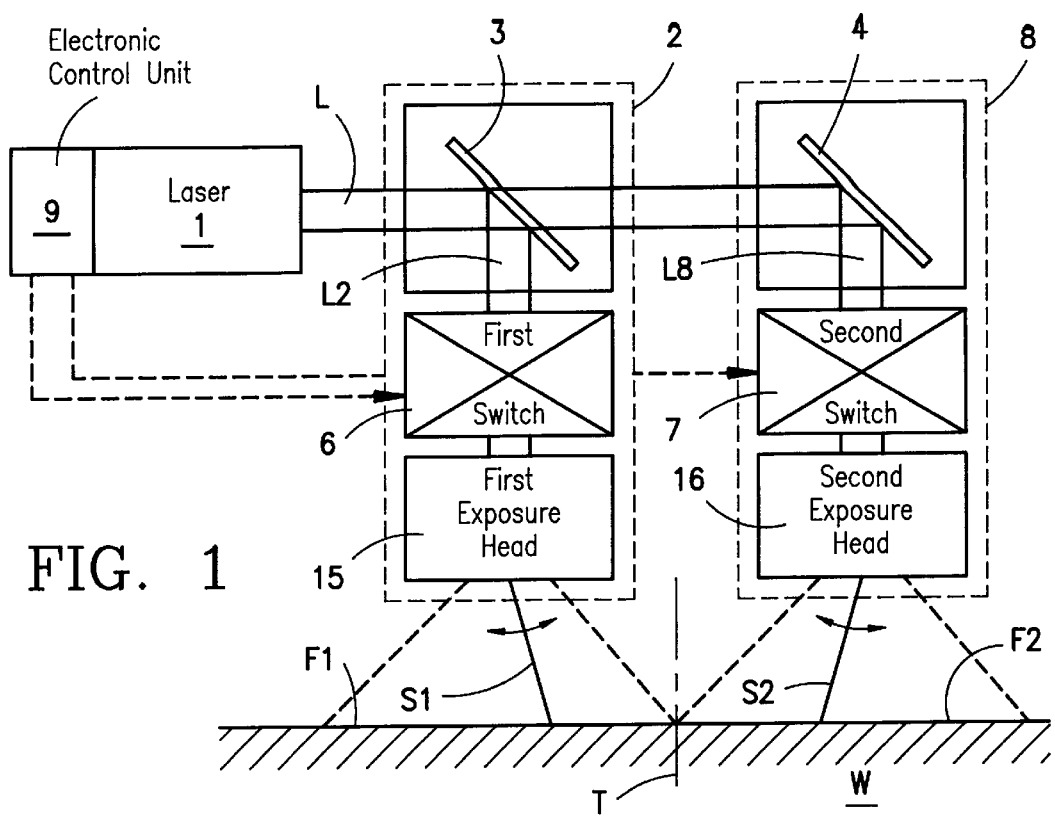
FIG. 1 shows a schematic representation of a double-head laser engraving machine.

The inventive multi-head laser engraving machine according to FIG. 1 permits not only simultaneous inscription of the working areas with the same inscription pattern but also different and simultaneous inscription in both working areas.

The machine shown schematically in FIG. 1 is designed as a double-head laser engraving machine but, as explained above, the machine can also be modified to be a three-head, four-head, . . . -head machine.

An Nd:YAG laser with an output of 60 watts delivers laser beam L to first exposure module 2 containing beam splitter 3. Beam splitter 3 deflects 50% of the laser beam and transmits 50% energy. The transmitted laser beam (partial beam) reaches second exposure module 8 containing tilted mirror 4.

Deflected laser beam L, from beam splitter 2 and deflected partial beam $L_8$ from tilted mirror 4 reach fast switches 6, 7, respectively.

Exposure heads 15, 16 following fast switches 6, 7 each contain a deflection unit/optical system not specified in FIG. 1, and raster-scan focused beam S1, S2 over corresponding working surface F1, F2 on the surface of workpiece W.

As explained above in conjunction with FIG. 4, separating line T in FIG. 1 also indicates that working areas F1 and F2 may belong to different workpieces.

Fast optical switches 6 and 7 in FIG. 1 are connected via a connection not shown with control unit 9 which opens or closes each switch 6 and 7 independently. This opening and closing turns engraving beam S1, S2 of exposure head 15, 16 on and off so that corresponding inscription of working surface F1, F2 takes place.

Figures 2A, 2B:
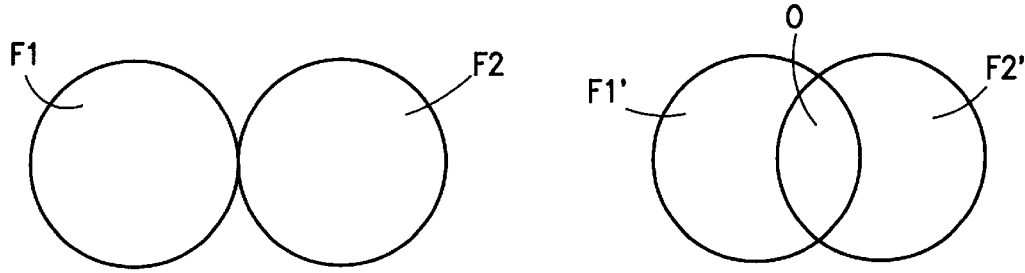
FIGS. 2a and 2b show schematically the arrangement of two working areas of the machine according to FIG. 1.

FIGS. 2a and 2b show possible embodiments for working areas F1 and F2. According to FIG. 2a the two working areas F1 and F2 are adjacent to each other. According to FIG. 2b working areas F1' and F2' overlap partly so that especially fast inscription can take place in overlap area O because the two independently controllable engraving beams S1 and S2 are available for inscription there.

Figure 3:
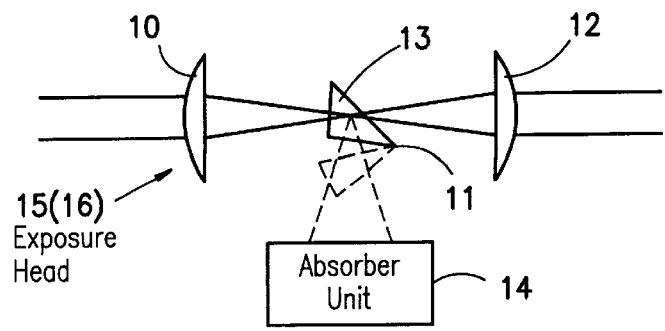
FIG. 3 shows a schematic representation of a fast optical switch as is shown schematically in FIG. 1 in positions 6 and 7.

FIG. 3 shows schematically the design of optical switch 6 shown schematically in FIG. 1. Since optical switch 7 is formed identically to switch 6, only switch 6 will be explained here.

The parallel bundle of rays of the laser beam is focused by lens 10. At the narrow point of the beam there is prism 13 swiveling about swiveling axis 11 which, in the position shown by unbroken lines, deflects the total beam energy to absorber unit 14. Thus no beam energy reaches the deflection unit/optical system following the assembly shown in FIG. 3 on the right after collimator lens 12. Lenses 10 and 12 form a Kepler telescope into whose focus the prism is swiveled.

FIG. 3 shows by dashed lines the open position of the switch. In this position prism 13 is swiveled about swiveling axis 11 out of the beam path so that the full energy of the beam passes through lens 12 to the deflection unit/optical system and then to the corresponding working area.

Prism 13 is swiveled about swiveling axis 11 with the aid of a deflection unit formed like a galvanometer mirror. Such an assembly permits switchover with a period of time of less than one millisecond between open position and closed position (and vice versa).

Absorber unit 14 shown schematically in FIG. 3 receives the impinging beam energy and removes it to the surroundings. In the selected example of an Nd:YAG laser with a power of 60 watts, prism 13 and absorber unit 14 must deflect or remove a focused power of 30 watts under least favorable conditions.

Modifications of the above-described embodiment are possible within the scope of the invention. According to FIG. 1 the beam splitter, fast optical switch and exposure head are combined structurally into module 2, and tilted mirror 4, optical switch 7 and the corresponding exposure head are combined structurally into module 8. As a variant, the two optical switches 6 and 7 according to FIG. 1 can be disposed at another place remote from beam splitter 3 or tilted mirror 4. The laser energy of partial beams $L_2$ and $L_8$ is then transferred to the relevant optical switch e.g. via optical fibers.

Also, exposure head 15, 16 need not structurally follow relevant optical switch 6, 7 directly. Here too a spatial separation can be effected e.g. with the aid of optical fibers.

What is claimed is:

1. A multi-head laser engraving machine having a laser (1), at least two exposure heads (15, 16) each with at least one of an optical system and deflection unit for directing part of a beam of energy from the laser (1) to a working area (F1, F2) of a workpiece surface as an engraving beam (Si, S2), and a control unit (9), characterized in that each exposure head (15, 16) has associated therewith a controlled optical switch (6, 7) for either transmitting or blocking the corresponding part of the laser beam energy, each switch (6, 7) comprising a swiveling deflection prism (13) which is swivelled, in accordance with a drive signal from the control unit (9), into an intermediate focus of a Kepler telescope (10, 12) of a laser beam path to switch the laser beam energy into or out of the intermediate focus, and the switches (6, 7) being drivable by the control unit (9) independently of each other.

2. The machine of claim 1, characterized in that two exposure heads (15, 16) each with an optical switch (6, 7) are provided.

3. The machine of claim 2, characterized in that the first exposure head (15) is preceded by a beam splitter (3) and the second exposure head (16) by a tilted mirror (4).

4. The machine of claim 1, characterized in that each switch (6, 7) has a deflection prism (13) swiveling into a focused partial beam of the laser beam energy.

5. The machine of claim 4, characterized in that an absorber unit (14) is provided for receiving the beam deflected by the deflection prism (13).

6. The machine of claim 1, characterized in that each exposure head (15, 16) has a deflection unit.

7. The machine of claim 1, characterized in that the working areas (F1', F2') at least partly overlap.

8. The machine of claim 6, wherein the deflection unit is a galvanometer deflection unit.

9. A multi-head laser engraving machine having a laser (1), at least two exposure heads (15, 16) each with at least one of an optical system and deflection unit for directing part of a beam of energy from the laser (1) to a working area (F1, F2) of a workpiece surface as an engraving beam (S1, S2), and a control unit (9), characterized in that each exposure head (15, 16) has associated therewith a controlled optical switch (6, 7) for either transmitting or blocking the corresponding part of the laser beam energy, each switch (6, 7) having a deflection prism (13) swiveling into an intermediate focus of a Kepler telescope of a laser beam path to switch the laser beam energy into or out of the intermediate focus, the Kepler telescope being constituted by a pair of lenses (10, 12) and the switches (6, 7) being drivable by the control unit (9) independently of each other.

\* \* \* \* \*